United States Patent
Yoon

(10) Patent No.: US 10,418,837 B2
(45) Date of Patent: Sep. 17, 2019

(54) WIRELESS CHARGING APPARATUS AND WIRELESS CHARGING METHOD

(71) Applicant: WITS Co., Ltd., Yongin-si, Gyeonggi-do (KR)

(72) Inventor: Dae Gil Yoon, Seoul (KR)

(73) Assignee: WITS Co., Ltd., Gyeonggi-do (KR)

(*) Notice: Subject to any disclaimer, the term of this patent is extended or adjusted under 35 U.S.C. 154(b) by 52 days.

(21) Appl. No.: 14/818,899

(22) Filed: Aug. 5, 2015

(65) Prior Publication Data

US 2016/0056662 A1 Feb. 25, 2016

(30) Foreign Application Priority Data

Aug. 19, 2014 (KR) .......................... 10-2014-0107562

(51) Int. Cl.
*H02J 7/00* (2006.01)
*H02J 7/02* (2016.01)
(Continued)

(52) U.S. Cl.
CPC .............. *H02J 7/025* (2013.01); *H02J 50/12* (2016.02); *H02J 50/80* (2016.02); *H04B 5/0037* (2013.01);
(Continued)

(58) Field of Classification Search
CPC .. H02J 7/025; H02J 5/005; H02J 17/00; H02J 50/80; H02J 50/12; H02J 50/40; H02J 50/10; H02J 7/0042; H02J 7/0052; H02J 2007/0096; H02J 7/045; H02J 50/60; H02J 50/90; H02J 7/042; H02J 7/0013; H02J 7/0004; H02J 50/70; H02J 7/022; H02J 7/0042; H02J 7/0044; H02J 50/50; H02J 7/0027; H02J 7/0054; H02J 7/0081;
(Continued)

(56) References Cited

U.S. PATENT DOCUMENTS

2010/0148939 A1 6/2010 Yamada et al.
2011/0127954 A1* 6/2011 Walley ................ H01M 2/0267
320/108

(Continued)

FOREIGN PATENT DOCUMENTS

| JP | 2010-148174 A | 7/2010 |
|---|---|---|
| KR | 10-2013-0073862 A | 7/2013 |
| KR | 10-2014-0007727 A | 1/2014 |

OTHER PUBLICATIONS

Korean Office Action dated Oct. 23, 2018 in counterpart Korean Patent Application No. 10-2014-0107562 (12 pages, in Korean with English translation).

*Primary Examiner* — Binh C Tat
(74) *Attorney, Agent, or Firm* — Harness, Dickey & Pierce, P.L.C.

(57) ABSTRACT

Disclosed herein are a wireless charging apparatus and a wireless charging method capable of avoiding a cross connection. A wireless charging apparatus, including: a controller receiving voltage range information from a mobile terminal and generating voltage pattern information corresponding to the voltage range information; a power converter generating authentication power having a predetermined voltage pattern corresponding to the voltage pattern information; and a resonator transmitting the authentication power to the mobile terminal.

8 Claims, 4 Drawing Sheets

(51) Int. Cl.
*H04B 5/00* (2006.01)
*H02J 50/12* (2016.01)
*H02J 50/80* (2016.01)
*H04W 8/00* (2009.01)
*H04W 8/24* (2009.01)

(52) U.S. Cl.
CPC ............... *H02J 2007/0001* (2013.01); *H02J 2007/0096* (2013.01); *H04W 8/005* (2013.01); *H04W 8/24* (2013.01)

(58) Field of Classification Search
CPC ............. H02J 7/02; H02J 2007/0001; H02J 2007/0039; H02J 50/20; H02J 7/0029; H02J 7/0047; H02J 7/022; H02J 7/0093; H04B 5/0037; H04B 5/02; H04B 5/00; H04W 8/24; H05B 33/08; Y02T 10/7072; Y02T 10/7005; Y02T 10/7055; Y02T 10/7216; Y02T 10/7241; Y02T 90/12

USPC .................................. 320/107–115
See application file for complete search history.

(56) References Cited

U.S. PATENT DOCUMENTS

| | | | |
|---|---|---|---|
| 2013/0062961 A1* | 3/2013 | Park | H02J 17/00 307/104 |
| 2013/0113296 A1* | 5/2013 | Ryu | H02J 7/025 307/104 |
| 2013/0154557 A1* | 6/2013 | Lee | H04B 5/0037 320/108 |
| 2014/0015330 A1 | 1/2014 | Byun et al. | |
| 2014/0077613 A1* | 3/2014 | Song | H02J 7/025 307/104 |
| 2014/0152251 A1* | 6/2014 | Kim | H02J 7/025 320/108 |
| 2015/0130409 A1* | 5/2015 | Lee | H02J 17/00 320/108 |

* cited by examiner

FIG. 6

| Field | Octets | Description | Use | Units |
|---|---|---|---|---|
| Optional fields validity | 1 | Defines which optional fields are populated | Mandatory | |
| Protocol Revision | 1 | A4WP Supported Revision | Mandatory | |
| RFU | 1 | Undefined | N/A | |
| RFU Category | 1 | Category of PRU | Mandatory | |
| PRU Information | 1 | Capabilities of PRU(bit field) | Mandatory | |
| Hardware rev | 1 | Revision of the PRU HW | Mandatory | |
| Firmware rev | 1 | Revision of the PRU HW | Mandatory | |
| $P_{RECT\_MAX}$ | 1 | $P_{RECT\_MAX}$ of the PRU | Mandatory | mW*100 |
| $V_{RECT\_MIN\_STATIC}$ | 2 | $P_{RECT\_MIN}$ (static, first estimate) | Mandatory | mW |
| $V_{RECT\_HIGH\_STATIC}$ | 2 | $P_{RECT\_HIGH}$ (static, first estimate) | Mandatory | mW |
| $V_{RECT\_SET}$ | 2 | $P_{RECT\_SET}$ | Mandatory | mW |
| Delta R1 value | 2 | Delta R1 caused by PRU | Optional | .01 ohms |
| RFU | 4 | Undefined | N/A | |

FIG. 7

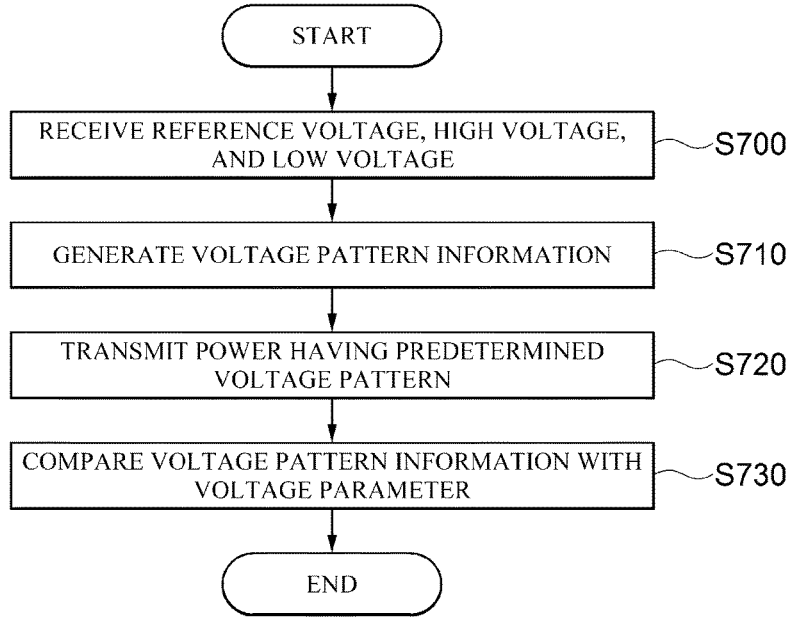

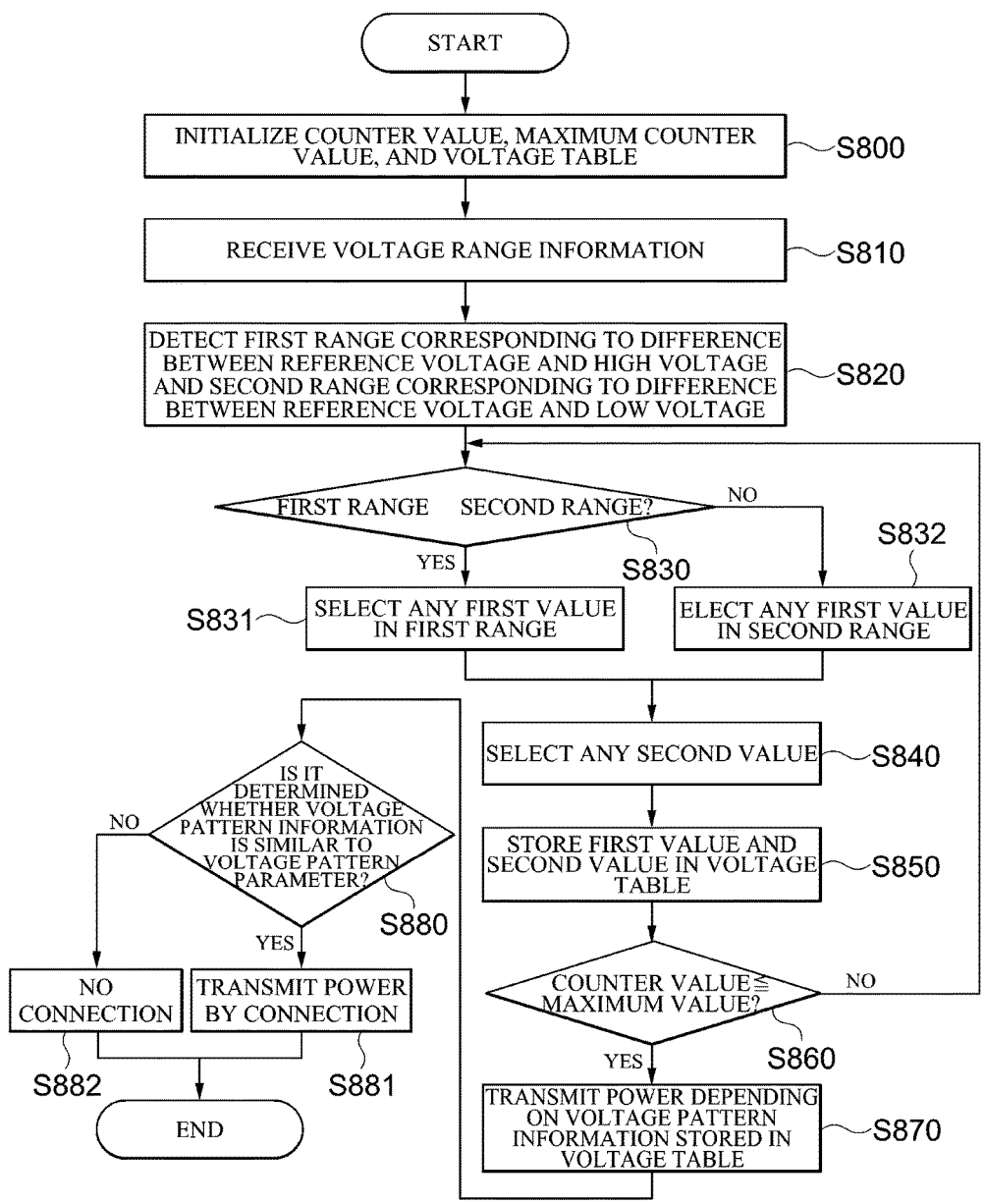

WIRELESS CHARGING APPARATUS AND WIRELESS CHARGING METHOD

This application claims the foreign priority benefit under 35 U.S.C. Section [120, 119, 119(e)] of Korean Patent Application Serial No. 10-2014-0107562, entitled "Wireless Charging Apparatus And Wireless Charging Method" filed on Aug. 19, 2014, which is hereby incorporated by reference in its entirety into this application.

BACKGROUND OF THE INVENTION

1. Technical Field

Embodiments of the present invention relates to a wireless charging apparatus and a wireless charging method.

2. Description of the Related Art

Generally, power needs to be continuously supply to operate mobile terminals. To this end, the mobile terminals are equipped with a battery. Generally, a battery is charged by a charger. A study on a contactless scheme, a wireless charging scheme, etc., has been conducted to support portability.

According to the wireless charging scheme, when mobile terminals to be charged are located in a power supply range of a wireless charging apparatus, the wireless charging apparatus senses an access of the mobile terminals and wirelessly supplies power to the mobile terminals. Prior to wirelessly supplying power, the wireless charging apparatus and the mobile terminals need a series of processes of searching for positions to each other. In this case, the wireless charging apparatus 100 determines the positions of the mobile terminals based on signal intensity transmitted from the mobile terminals, and the like to determine whether the mobile terminals are positioned in the chargeable range.

However, when the wireless charging apparatus determines whether the mobile terminals are positioned in the charging range based on the signal intensity, a cross connection occurs between the mobile terminals receiving power from the wireless charging apparatus and mobile terminals receiving power from another wireless charging apparatus adjacent to the wireless charging apparatus, and therefore the wireless charging apparatus may transmit power to other mobile terminals.

SUMMARY OF THE INVENTION

An object of the present disclosure is to provide a wireless charging apparatus and a wireless charging method capable of avoiding a cross connection.

According to an exemplary embodiment of the present invention, there is provided a wireless charging apparatus, including: a controller receiving voltage range information from a mobile terminal and generating voltage pattern information corresponding to the voltage range information; a power converter generating authentication power having a predetermined voltage pattern corresponding to the voltage pattern information; and a resonator transmitting the authentication power to the mobile terminal.

According to another exemplary embodiment of the present invention, there is provided a wireless charging method for wirelessly transmitting power to an authenticated mobile terminal, including: authenticating the mobile terminal; and charging the mobile terminal by transmitting power to the mobile terminal, wherein the authenticating includes transferring authentication power having a predetermined voltage pattern to the mobile terminal.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 is a diagram illustrating an exemplary embodiment of static parameters transferred from a mobile terminal in the wireless charging apparatus illustrated in FIG. 2.

FIG. 7 is a flow chart illustrating a first exemplary embodiment of an authentication method in the wireless charging apparatus illustrated in FIG. 2.

FIG. 8 is a flow chart illustrating a second exemplary embodiment of an authentication method in the wireless charging apparatus illustrated in FIG. 2.

DESCRIPTION OF EMBODIMENTS

Figure 1:
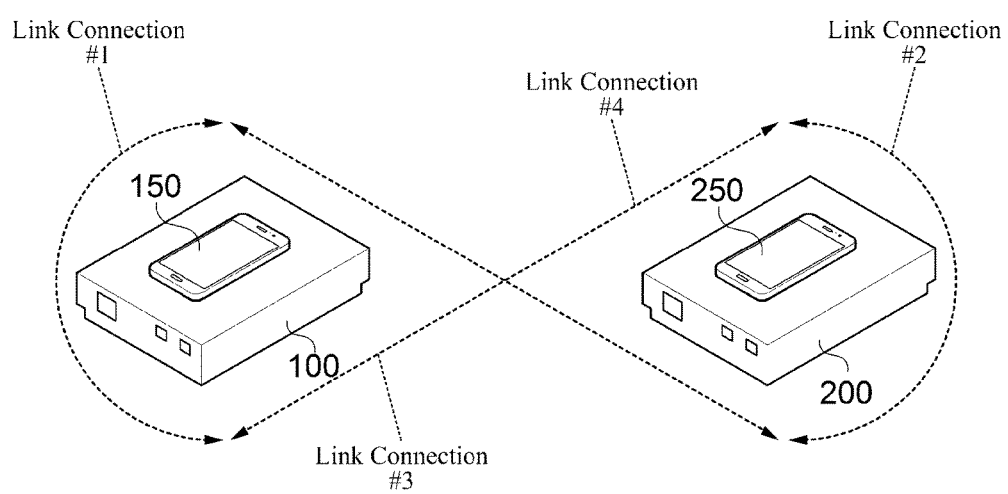
FIG. 1 is a conceptual diagram illustrating a wireless charging system using a wireless charging apparatus according to an exemplary embodiment of the present disclosure.

The acting effects and technical configuration with respect to objects of a wireless charging apparatus and a wireless charging method according to the present disclosure will be clearly understood by the following description in which exemplary embodiments of the present disclosure are described with reference to the accompanying drawings.

Further, when it is determined that the detailed description of the known art related to the present disclosure may obscure the gist of the present disclosure, the detailed description thereof will be omitted. In the present specification, the terms first, second, and so on are used to distinguish one element from another element, and the elements are not defined by the above terms.

Exemplary embodiments of the present disclosure will be described in detail with reference to the accompanying drawings illustrating an example of specific exemplary embodiments which may be practiced by the present disclosure. These embodiments will be described in detail for those skilled in the art in order to practice the present disclosure. It should be appreciated that various exemplary embodiments of the present disclosure are different from each other, but do not have to be exclusive. For example, specific shapes, structures, and characteristics described in the present specification may be implemented in another exemplary embodiment without departing from the spirit and the scope of the present disclosure in connection with an exemplary embodiment. In addition, it should be understood that a position or an arrangement of individual components in each disclosed exemplary embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will be used to describe the same or similar functions throughout the accompanying drawings in various aspects.

Hereinafter, embodiments of the present disclosure will be described in detail with reference to the accompanying drawings so that those skilled in the art may easily practice the present disclosure.

FIG. 1 is a conceptual diagram illustrating a wireless charging system using a wireless charging apparatus according to an exemplary embodiment of the present disclosure.

Referring to FIG. 1, in a wireless charging system, a first mobile terminal 150 may be positioned in a charging range of a first wireless charging apparatus 100 to generate a link connection #1 so as to connect between the first wireless charging apparatus 100 and the first mobile terminal 150 and a second wireless charging 200 is positioned at a position adjacent to the first wireless charging apparatus 100 and a second mobile terminal 250 may be positioned in a charging range of the second wireless charging apparatus 200 to generate a link connection #2 so as to connect between the second wireless charging apparatus 200 and the second mobile terminal 250. Therefore, the first wireless charging apparatus 100 may supply power to the first mobile terminal 150 and the second wireless charging apparatus 200 may supply power to the second mobile terminal 250. In this configuration, the first wireless charging apparatus 100 and the second wireless charging apparatus 200 are adjacent to each other to enable the second wireless charging apparatus 200 to recognize the first mobile terminal 150 which is positioned in the charging range of the first wireless charging apparatus 100. The first wireless charging apparatus 100 may recognize the second mobile terminal 250 which is positioned in the charging range of the second wireless charging apparatus 200. By the recognition, when the second wireless charging apparatus 200 is connected to the first mobile terminal 150 through a third connection #3 or connected to the second mobile terminal 250 through a link connection #4, the first wireless charging apparatus 100 and the second wireless charging apparatus 200 may each supply power to the second mobile terminal 250 and the first mobile terminal 150 and thus power transmission efficiency of the wireless charging apparatus may be reduced. Therefore, there is a need to prevent a generation of a cross connection that the link connection #3 and the link connection #4 are generated in the state in which the link connection #1 and the link connection #2. To this end, the first wireless charging apparatus 100 and/or the second wireless charging apparatus 200 needs to perform authentication at the time of the link connection #1 and the link connection #2 and supply power to only the authenticated mobile terminal. In this case, the link connection #1 and the link connection #2 each illustrate that one mobile terminal is connected to one wireless charging apparatus, but the exemplary embodiment of the present disclosure is not limited thereto, and therefore in the case of the link connection #1, several mobile terminals may be connected to one wireless charging apparatus and the link connection #2 may be the same. It is illustrated herein that the charging range is on the first wireless charging apparatus 100 and the second wireless charging apparatus 200. However, the exemplary embodiment of the present disclosure is not limited thereto and therefore if the charging range may be positioned within a predetermined distance from the wireless charging apparatus 100 regardless of all directions, the wireless charging apparatus 100 may be believed to be in the charging range. Herein, the first mobile terminal 150 and the second mobile terminal 250 may be electronics such as a mobile communication terminal, a tablet PC, a notebook, and the like which may be supplied with power by a battery.

Figure 2:
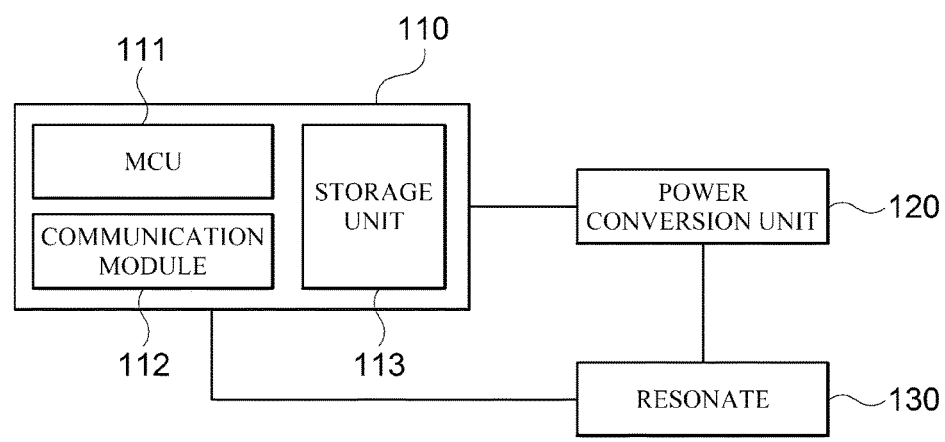
FIG. 2 is a structural diagram illustrating an exemplary embodiment of the wireless charging apparatus illustrated in FIG. 1.

FIG. 2 is a structural diagram illustrating an exemplary embodiment of the wireless charging apparatus illustrated in FIG. 1.

Referring to FIG. 2, the wireless charging apparatus 100 may include a controller 110 which receives voltage range information from a mobile terminal to generate voltage pattern information corresponding to the voltage range information, a power converter 120 which generates authentication power having a predetermined voltage pattern corresponding to the voltage pattern information, and a resonator 130 which transmits the authentication power to the mobile terminal 150.

Figure 3:
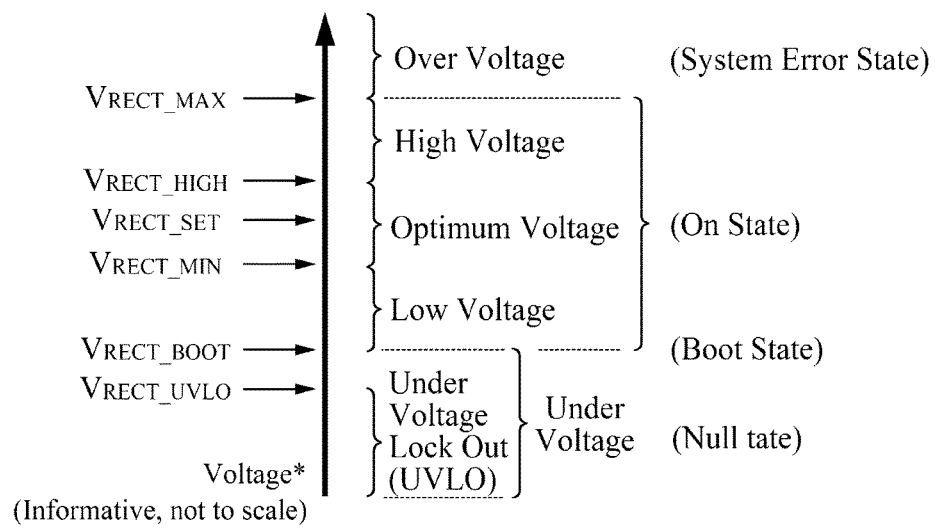
FIG. 3 is a diagram illustrating an operation range of a mobile terminal depending on a voltage output from a battery.

The controller 110 may control the power converter 120 in response to an authentication operation and a charging operation. The controller 110 generates the authentication power from the authentication operation and transmits the generated authentication power to the mobile terminal 150 to determine whether the mobile terminal 150 is present within the charging range of the wireless charging apparatus 100 and makes the wireless charging apparatus 100 to supply power to the mobile terminal 150 authenticated by the authentication operation in the charging operation, thereby preventing the wireless charging apparatus 100 from being connected to the mobile terminal 150 which is supplied with power from another wireless charging apparatus adjacent to the wireless charging apparatus 100 while the wireless charging apparatus 100 supplies power. The voltage range information may be supplied when the wireless charging apparatus 100 scans the mobile terminal 150 to be charged before the authentication operation. FIG. 3 is a diagram illustrating the operation range of the mobile terminal depending on the voltage output from the battery which is used in the mobile terminal. That is, when the voltage output from the battery is positioned between a booting voltage VRECT_BOOT and a maximum voltage VRECT_MAX, the mobile terminal may be in a turned on state. In particular, the battery may output optimum power in a reference voltage VRECT_SET, a high voltage VRECT_HIGH, and a low voltage VRECT_MIN. The voltage range information transferred from the mobile terminal 150 may be information on a standard of the battery which is embedded in the mobile terminal 150, and the like. The information on the standard of the battery may be capacity of the battery and the reference voltage VRECT_SET, the high voltage VRECT_HIGH, and the low voltage VRECT_MIN which are output from the battery. The controller 110 may use the received voltage range information to generate the voltage pattern information having any pattern. Further, the controller 110 may use the voltage pattern information to authenticate the mobile terminal 150.

Further, the controller 110 may enable the power converter 120 to output a short-beacon and a long-beacon. When the mobile terminal 150 receives the short-beacon and the long-beacon, the mobile terminal 150 may transfer advertising to inform that it is positioned in the charging range from the wireless charging apparatus 100. Further, when the controller 110 receives the advertising through the wireless communication module 112, the controller 110 may request information on the voltage range, and the like to the mobile terminal 150.

Further, the controller 110 may include an MCU 111 which generates a control signal and a communication module 112 which may be operated by a control of an MCU 111 and communicate with the mobile terminal 150. The MCU 111 uses the voltage range information transferred through the communication module 112 to generate the voltage pattern information and may control the power converter 120 and the resonator 130. Further, the controller 110 further includes a storage unit 113 which may store the voltage pattern information generated from the controller 110. Further, the storage unit 113 may store software such as firmware of the wireless charging apparatus 110.

The power converter 120 may output the short-beacon and the long-beacon according to the control of the controller 110. The power converter 120 may generate the authentication voltage having a predetermined voltage pattern depending on the voltage pattern information which is generated by the controller 110. Further, the power converter 120 may generate power to be supplied to the authenticated mobile terminal 150.

The resonator 130 may supply the power generated from the power converter 120 to the mobile terminal 150. The resonator 130 may serve as an antenna and includes a coil to make power transmitted in response to a change in impedance of the coil be a signal having a predetermined frequency.

Figure 4:
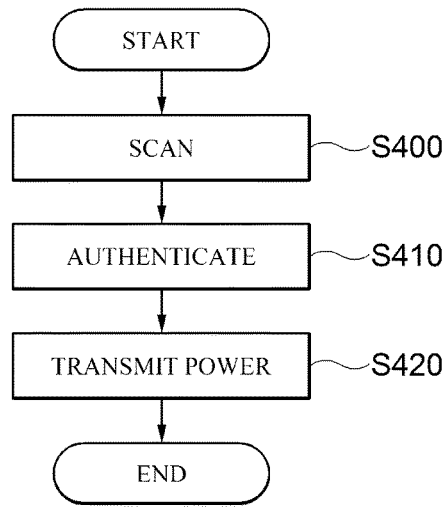
FIG. 4 is a flow chart illustrating a first exemplary embodiment of an operation of the wireless charging apparatus illustrated in FIG. 2.

FIG. 4 is a flow chart illustrating a first exemplary embodiment of an operation of the wireless charging apparatus illustrated in FIG. 2.

Figure 5:
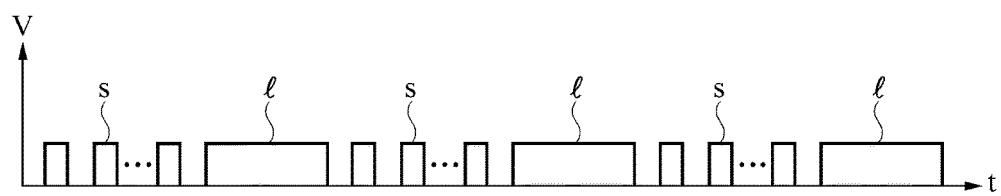
FIG. 5 is a timing diagram illustrating a short beacon and a long beacon output from the wireless charging apparatus illustrated in FIG. 2.

Referring to FIG. 4, the wireless charging apparatus 100 performs a scan operation to determine whether the mobile terminal 150 is positioned within the charging range (S400). As illustrated in FIG. 5, the wireless charging apparatus 100 may repeatedly output a short-beacon s and a long-beacon l in the scan operation. The short-beacon s may be a pulse having a short length and the long-beacon l may be a pulse having a long length. Further, in the wireless charging apparatus 100, the short-beacon s is repeated in plural and then one long-beacon l may be generated. Here, the short-beacon s and the long-beacon l periodically appear but the exemplary embodiment of the present disclosure is not limited thereto. When the mobile terminal 150 receives the short-beacon s and/or the long-beacon l from the wireless charging apparatus 100, the mobile terminal may transmit the advertising to the wireless charging apparatus 100. When the wireless charging apparatus 100 receives the advertising, it may be determined that the mobile terminal 150 is in the charging range.

Further, the wireless charging apparatus 100 may authenticate the mobile terminal 150 (S410). The wireless charging apparatus 100 may be operated as follows in the authentication operation. The wireless charging apparatus 100 may receive the advertising through the communication module 112 in the scan operation and then transfer a request signal to the mobile terminal 150 transmitting the advertising to request a static parameter. The mobile terminal 150 may transmit the static parameter to the wireless charging apparatus 100 in response to the request signal. The static parameter transmitted from the mobile terminal 150 to the wireless charging apparatus 100 may include mobile terminal information, firmware version, reference voltage information, high voltage information, low voltage information, and the like, as illustrated in FIG. 6. The wireless charging apparatus 100 may use the reference voltage information, the high voltage information, and the low voltage information which are recorded in the static parameter in the authentication operation. As illustrated in FIG. 6, a PTU and a PRU mean the wireless charging apparatus 100 and the mobile terminal 150. That is, the wireless charging apparatus 100 uses the reference voltage information, the high voltage information, and the low voltage information to generate the authentication power having any voltage pattern information and supply the generated authentication power to the mobile terminal 150, in which the mobile terminal 150 may generate a voltage parameter corresponding to the authentication power and transmit the generated voltage parameter to the wireless charging apparatus 100. The wireless charging apparatus 100 compares the voltage pattern information with the voltage parameter and if it is determined that the voltage pattern information agrees the voltage parameter, may authenticate the mobile terminal 150. In this case, the fact that the voltage pattern information agrees the voltage parameter does not mean the complete agreement, and therefore a tolerable error may be present.

When the mobile terminal 150 is authenticated, the wireless charging apparatus 100 may transmit power (S420). The wireless charging apparatus 100 may use the resonator 130 to transmit power generated from the power converter 120 to the mobile terminal 150. The power transmitted to the mobile terminal 150 may be transmitted in response to the reference voltage information, the high voltage information, and the low voltage information of the static parameter.

FIG. 7 is a flow chart illustrating a first exemplary embodiment of an authentication method in the wireless charging apparatus illustrated in FIG. 2.

The wireless charging apparatus 100 may receive the reference voltage information VRECT_SET, the high voltage information VRECT_HIGH, and the low voltage information VRECT_MIN, which are included in the static parameter, from the mobile terminal 150 through the communication module 112 (S700). The wireless charging apparatus 100 may use the reference voltage information VRECT_SET, the high voltage information VRECT_HIGH, and the low voltage information VRECT_MIN to generate the voltage pattern information (S710). The voltage pattern information may be selected within the voltage range between the high voltage and the reference voltage or the voltage range between the reference voltage and the low voltage. For example, if it is assumed that the high voltage is 15 V, the reference voltage is 10 V, and the low voltage is 5 V, any voltage may be selected within a first range from 10 V to 15 V which is between the high voltage and the reference voltage or within a second range from 5 to 10 V to select the voltage pattern information. That is, when the first range is selected, any voltage pattern in which a voltage is changed to 11 V, 12 V, 15 V, 13 V, and 11 V may be generated and when the second range is selected, any voltage pattern in which a voltage is changed to 5 V, 8 V, 9 V, 6 V, and 8 V may be generated. The voltage pattern described herein is only an example and therefore the exemplary embodiment of the present disclosure is not limited. Further, the voltage pattern may be stored in the voltage table which is present in the storage unit 113.

The wireless charging apparatus 100 may use the generated voltage pattern information to transmit the authentication power having a predetermined voltage pattern to the mobile terminal 150 (S720).

Further, the mobile terminal 150 receiving the authentication power may transmit the voltage parameter corresponding to the voltage pattern information to the wireless charging apparatus 100 and the wireless charging apparatus 100 may compare the voltage pattern information with the voltage parameter to authenticate the mobile terminal 150.

FIG. 8 is a flow chart illustrating a second exemplary embodiment of an authentication method in the wireless charging apparatus illustrated in FIG. 2.

Referring to FIG. 8, the controller 110 of the wireless charging apparatus 100 may initialize a counter value, a maximum counter value, and the voltage table which are stored in the storage unit 113 (S800). The counter value, the maximum counter value, and the voltage table may be differently set depending on the mobile terminals which will receive power and therefore may be initialized prior to starting the wireless charging. Further, the wireless charging apparatus may receive the voltage range information of the mobile terminal 150 which is positioned in the charging range through the communication module 112 of the controller 110 (S810). To receive the voltage range information from the mobile terminal 150, the controller 110 may perform the scan operation to search for the mobile terminal 150. As illustrated in FIG. 5, the scan operation may be performed to generate the short-beacon s and the long-beacon l from the power converter 120 and output the generated short-beacon s and long-beacon l through the resonator 130. Further, when receiving the short-beacon s and/or the long-beacon l, the mobile terminal 150 may transfer the advertising to the wireless charging apparatus 100, and the wireless charging apparatus 100 may receive the advertising through the communication module 112 to recognize the mobile terminal 150. When receiving the advertising, the wireless charging apparatus 100 may transmit the request signal to the mobile terminal 150. When receiving the request signal, the mobile terminal 150 may transmit the static parameter to the wireless charging apparatus 100. The static parameter includes the voltage range information, and thus the wireless charging apparatus may receive the static parameter to receive the voltage range information. Further, the wireless charging apparatus may receive the counter value and the maximum counter value as the static parameter. Further, the controller 110 may detect the first range which is the difference between the reference voltage and the high voltage and the second range which is the difference between the reference voltage and the low voltage (S820). Further, the controller 110 may detect the narrower range of the first range and the second range (S830). When the first range is narrower, the first range may be selected and any first value may be selected in the first range (S831) and when the second range is narrower, the second range may be selected and any first value may be selected in the selected first range (S832). Further, to set a sign, any second value may be selected (S840). When the any selected second value is an even number, the sign is set to be positive (+) and when the any selected second value is an odd number, the sign is set to be negative (−). However, a method for setting a sign is not limited thereto. It may be determined whether to perform the selection in the first range or whether to perform the selection in the second range based on the sign setting. Further, the selected first value and second value may be stored in the voltage table (S850). Further, if it is determined that the counter value is smaller than the maximum counter value by comparing the counter value with the maximum counter value, the counter value is increased by 1 and then step S830 is again performed. Further, if it is determined that the counter value is equal to or larger than the maximum counter value, the authentication power may be generated and transmitted depending on the voltage pattern information which is stored in the voltage table (S870). In this case, the voltage value of the authentication power may be generated and generated by a scheme of adding or subtracting the selected first value to or from the reference voltage. When the sign by the second value is positive (+), the first value may be added to the reference voltage and when the sign by the second value is negative (−), the first value may be subtracted from the reference voltage. Further, it is determined whether the voltage pattern information is similar to the voltage pattern parameter (S880). The voltage pattern parameter is transmitted from the mobile terminal 150 and the mobile terminal which receives the authentication power may generate the voltage pattern parameter corresponding to the voltage pattern of the authentication power and transmit the generated voltage pattern parameter to the wireless charging apparatus 100. Further, when the voltage pattern information is similar to the voltage pattern parameter, the wireless charging apparatus 100 is connected to the mobile terminal to transmit power (S881) and when the voltage pattern information is not similar to the voltage pattern parameter, the wireless charging apparatus 100 is not connected to the mobile terminal 150 so as not to transmit power (S882).

As set forth above, according to the wireless charging apparatus and the wireless charging method in accordance with the exemplary embodiments of the present disclosure, it is possible to prevent the power transmission efficiency from being reduced at the time of the wireless charging by preventing the cross connection.

The wireless charging method according to the exemplary embodiment of the present disclosure may be implemented as a program instruction type that may be performed through various computer units and may be recorded in a computer readable medium. The computer-readable recording medium may include a program command, a data file, a data structure or the like, alone or a combination thereof. The program commands recorded in the computer-readable recording medium may be especially designed and constituted for the present disclosure or be known to those skilled in a field of computer software. An example of the computer readable recording medium may include magnetic media such as hard disk, floppy disk, magnetic tape, and the like, optical media such as CD-ROM, DVD, and the like, magneto-optical media such as floptical disk, and hardware devices specially configured to store and perform program commands such as ROM, RAM, flash memory, and the like. Examples of the program commands may include a high-level language code capable of being executed by a computer using an interpreter, or the like, as well as a machine language code made by a compiler. The hardware device may be constituted to be operated as one more software modules in order to perform the action according to the present disclosure, and vise versa.

In the present specification, 'one embodiment' of principles of the present disclosure and names for various changes of the expression mean that specific features, structures, characteristics, and the like, associated with the embodiment are included in at least one embodiment of the principle of the present disclosure. Therefore, the expression 'one embodiment' and any other modification examples disclosed throughout the present specification do not necessarily mean the same embodiment.

In the present specification, 'connected' or 'connecting' and names for various modifications of these expressions are used as a meaning including ones directly connected to other components or ones indirectly connected thereto through other components. Unless explicitly described to the contrary, a singular form includes a plural form in the present specification. In addition, components, steps, operations, and elements mentioned as 'comprise' or 'comprising' in the present specification do not exclude the existence or addition of one or more other components, steps, operations, and elements, and apparatuses.

What is claimed is:

1. A wireless charging apparatus, comprising:
a controller configured to receive voltage range information from a mobile terminal and generate voltage pattern information corresponding to the voltage range information;
a power converter configured to generate authentication power having a predetermined voltage pattern corresponding to the voltage pattern information; and
a resonator configured to transmit the authentication power to the mobile terminal,
wherein the controller is configured to compare the voltage pattern information with a voltage pattern parameter received from the mobile terminal, and transmit power to the mobile terminal in response to the voltage pattern parameter matching the voltage pattern information.

2. The wireless charging apparatus according to claim 1, wherein the controller further includes a communication module configured to receive the voltage range information from the mobile terminal.

3. The wireless charging apparatus according to claim 2, wherein the controller further includes a storage unit configured to store the generated voltage pattern information.

4. The wireless charging apparatus according to claim 1, wherein the controller further includes an MCU configured to generate the voltage pattern information.

5. The wireless charging apparatus according to claim 1, wherein the controller is operated by being divided into an authentication section and a power transmission section configured to transmit power to the mobile terminal authenticated in the authentication section, generate the voltage pattern information and compare the voltage pattern information with a voltage pattern parameter received from the mobile terminal in the authentication section.

6. The wireless charging apparatus according to claim 2, wherein the controller is operated by being divided into an authentication section and a power transmission section configured to transmit power to the mobile terminal authenticated in the authentication section, and
the authentication section is configured to start in response to the mobile terminal receiving advertising from the communication module.

7. The wireless charging apparatus according to claim 1, wherein the voltage range information includes information on a reference voltage, a high voltage, and a low voltage and the voltage pattern information selects one of a voltage range corresponding to a difference between the high voltage and the reference voltage and a voltage range corresponding to a difference between the reference voltage and the low voltage and selects and generates any first voltage and second voltage within the selected voltage range.

8. The wireless charging apparatus according to claim 6, wherein the controller further includes a sensing section in which at least one of a short-beacon and a long-beacon is repeated to transmit power prior to the authentication section and receives the advertising in the sensing section.

* * * * *